(12) United States Patent  
Crawford et al.

(10) Patent No.: US 7,937,335 B2  
(45) Date of Patent: *May 3, 2011

(54) ARTICLE AND METHOD FOR FINDING A COMPACT REPRESENTATION TO VISUALIZE COMPLEX DECISION TREES

(75) Inventors: Stuart Crawford, Piedmont, CA (US); Gaurav Chhaparwal, Rajasthan (IN); Kashyap Babu Rao Kolipaka, Karnataka (IN); Navin Doshi, Karnataka (IN); Sergei Tolmanov, Walnut Creek, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/854,090

(22) Filed: Aug. 10, 2010

(65) Prior Publication Data

US 2010/0306167 A1    Dec. 2, 2010

Related U.S. Application Data

(63) Continuation of application No. 11/845,291, filed on Aug. 27, 2007, now Pat. No. 7,831,526.

(60) Provisional application No. 60/823,618, filed on Aug. 25, 2006.

(51) Int. Cl.  
*G06F 17/00* (2006.01)  
*G06F 17/20* (2006.01)

(52) U.S. Cl. .................................................... 706/11

(58) Field of Classification Search .................. 706/11  
See application file for complete search history.

(56) References Cited

OTHER PUBLICATIONS

B. Gaines, "Transforming Rules and Trees into Comprehensible Knowledge Structures", Advances in Knowledge Discovery and Data Mining, 205-28, 1996.*  
R. Kohavi, "Bottom-Up Induction of Oblivious Read-Once Decision Graphs", European Conf. on Mach. Learning, 1994, pages unknown.*

* cited by examiner

*Primary Examiner* — Donald Sparks  
*Assistant Examiner* — Vincent M Gonzales  
(74) *Attorney, Agent, or Firm* — Mintz, Levin, Cohn, Ferris, Glovsky and Popeo, P.C.

(57) ABSTRACT

The invention comprises an article and method for transforming a complex or large decision tree having multiple variables; multiple values for each variable; and, multiple outcomes for each combination of variables and their associated values, into a compact, efficient graphical representation to provided enhanced ease of use and interaction by a human user. More particularly, the invention comprises a computationally efficient method for transforming an input decision tree into an optimal compact representation by computing a particular ordering of variables in the decision tree that first leads to a Directed Acyclic Graph, or "DAG," with a minimum number of nodes. The method then converts the DAG into an exception-based DAG, or "EDAG," with exactly one exception, having an optimal, minimum number of nodes with increased comprehensibility for a user.

18 Claims, 19 Drawing Sheets

ARTICLE AND METHOD FOR FINDING A COMPACT REPRESENTATION TO VISUALIZE COMPLEX DECISION TREES

CROSS-REFERENCES

This application is a Continuation of patent application Ser. No. 11/845,291, filed on Aug. 27, 2007, now U.S. Pat. No. 7,831,526 entitled "ARTICLE AND METHOD FOR FINDING A COMPACT REPRESENTATION TO VISUALIZE COMPLEX DECISION TREES, which claims priority to related provisional patent application Ser. No. 60/823,618 filed Aug. 25, 2006, entitled "Strategy and Ruleset Visualization," of which the contents of both are hereby fully incorporated by reference.

BACKGROUND OF THE INVENTION

1. Technical Field

The invention relates to the organization and viewing of information. More particularly, the invention relates to a methodology for efficiently transforming large or complex decision trees into compact, optimized representations to ease viewing and interaction by a user.

2. Discussion of the Related Art

A decision tree is a structure composed of nodes and links in which the end nodes, also called leaf nodes, represent actions to be taken, the interior nodes represent conditions to be tested on variables, and the branches represent conjunctions of conditions that lead to actions.

A decision tree can represent a series of decisions that divide a population into subsets. The first decision divides the population into two or more segments (i.e. partitions). For each of these segments, a second decision divides the segment into smaller segments. The second decision depends on the choice for the first decision, and the third decision depends on the choice for the second decision, and so on. In other words, a decision tree can be used to segment a dataset in such a way that an action node of the tree corresponds to that segment of the dataset for which all the conditions along the branch from root to that action node are satisfied.

A leveled decision tree is one where the variables appearing along each branch are always in the same order. A decision tree is said to be 'read once' when no variable appears twice along any branch.

Depending on the decision process being modeled, a decision tree can be extremely complex, having many variables, many values for those variables, and many outcomes depending on the various combinations of the variables and their associated values.

A sample leveled decision tree is shown in FIG. 1. The tree determines the type of credit card that a bank gives to its credit card applicants on the basis of their job, income and value of assets. In this example, "Job," "Income" and "Assets" are the variables on which conditions are defined. For example, if a customer satisfies the conditions, "Job=Business AND Income<$100K" AND "Assets>$200K," the conclusion leaf node reached is "Card=Bronze."

Information presented in the form of a decision tree becomes difficult to comprehend and visualize when the tree is large. This invention relates to a method for finding an optimal ordering of the variables of the decision tree, and using that ordering to convert the tree to an optimal Directed Acyclic Graph, i.e., a "DAG," such that the DAG represents the same information found in the tree but with the smallest possible number of nodes compared to any other ordering of variables.

A DAG is a Directed Graph with no cycles or loops. A Directed Graph is a set of nodes and a set of directed edges, also known as arcs or links, connecting the nodes. The edges have arrows indicating directionality of the edge.

Tree representations are comprehensible 'knowledge structures' when they are small, but become more and more incomprehensible as they grow in size. Comprehensibility of the knowledge structure is a critical issue since, ultimately, humans must work with and maintain such structures.

The reason why trees often become large is the repeated occurrence of identical subsets of conditions interspersed throughout the tree. This phenomenon is called "sub-tree replication."

Others have attempted to resolve the problems associated with sub-tree replication. Ron Kohavi, in his research paper, "Bottom-up Induction of Oblivious Read-Once Decision Graphs," published in the "European Conference on Machine Learning," 1994, introduced a new representation for a decision tree, called the "Oblivious read-once Decision Graph," i.e., the "OODG." He also described a method to convert a tree representation to the OODG representation. However, Kohavi's method chooses the ordering of constituents in an ad hoc manner, which fails to ensure the resulting representation will have the least number of nodes.

Brian R. Gaines, in his research paper "Transforming Rules and Trees into Comprehensible Knowledge Structures," suggests an alternative representation for general decision trees called the "Exception-based Directed Acyclic Graph," i.e., an "EDAG." An "exception" is a clause that has been put alongside a condition, such that, if the condition fails to be satisfied, this clause, called an exception, shall be assumed to be the conclusion for the decision tree. Gaines, however, also fails to address the issue of variable ordering.

Steven J. Friedman and Kenneth J. Supowit, in their research paper, "Finding the Optimal Variable Ordering for Binary. Decision Diagrams," published in "IEEE Transactions on Computers," Vol. 39, No. 5 in May 1990, discuss a method for finding the optimal variable ordering where the variables of the decision tree are restricted to having only two values, namely true or false. The representation thus restricts the segmentation of a branch into at most two branches by checking on a given condition to be either true or false. This method is intended to be used in the design of electronic circuits only where the outcome of a "decision" is binary. The method cannot be applied directly to a general decision tree where the variables cannot be restricted to the binary values of either true or false.

Given the limitations of the prior art, there exists a need for a method to create an understandable representation of complex decision trees that is both comprehensible by a human user and is computable in practically feasible amounts of time.

SUMMARY OF THE INVENTION

The invention comprises a method for transforming a large decision tree into a more compact representation to ease use and interaction by a human user. More particularly, the invention comprises a method for transforming an input decision tree into an optimal compact representation by computing a particular ordering of variables in the decision tree that first leads to a Directed Acyclic Graph, or "DAG," with a minimum number of nodes. The method then converts the DAG into a comprehensible exception-based DAG, or "EDAG," with exactly one exception. The optimized EDAG presents the same information and knowledge structure provided in the original input decision tree, but in a more compact representation.

The method of the invention includes the following novel features:
1. An optimal ordering of the variables in the decision tree is computed, such that when the original input decision tree is converted to a DAG, the DAG has a minimum number of nodes over all possible orderings of variables. This DAG structure is referred to as the "Optimal Model".
2. If all possible variable orderings were evaluated, then computations on the order of n! (i.e., n factorial, where n denotes the number of variables) would be required. This method performs computations on subsets of the sets of variables instead of the orderings of those variables, requiring far fewer computations. This method significantly reduces computational requirements since the number of computations is reduced to the order of $2^n$, i.e., 2 raised to the power of n, as opposed to n!.
3. An Optimal Model having a minimum number of nodes is created during the process of computing the optimal ordering.
4. The method works for decision trees whose variables may have a plurality of conditions. The method does not require, for example, that the variables have only two conditions, e.g., true or false, as found in Binary Decision Diagrams that support only two possible states of variables.

DETAILED DESCRIPTION OF A PREFERRED EMBODIMENT

Figure 10:
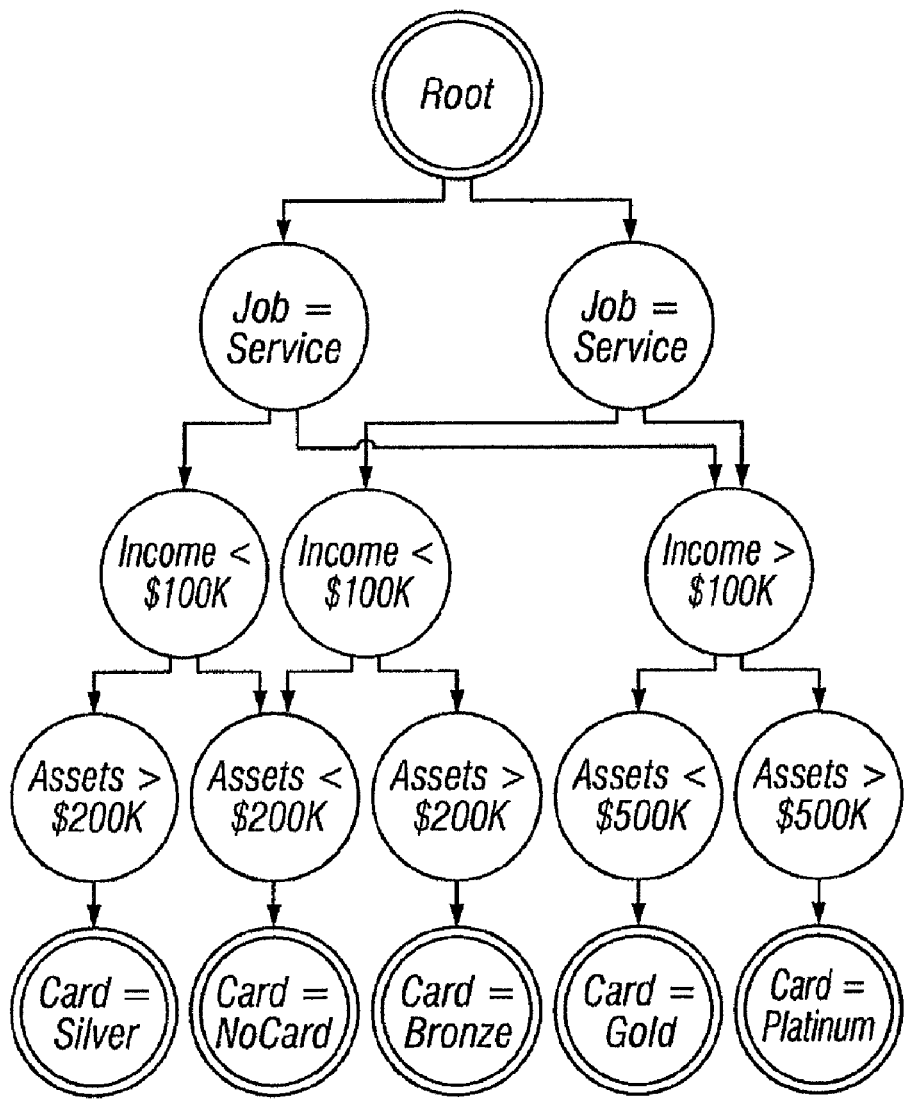
FIG. 10 is an illustration of an optimal model for the complete set of variables, according to the invention.
Figure 11:
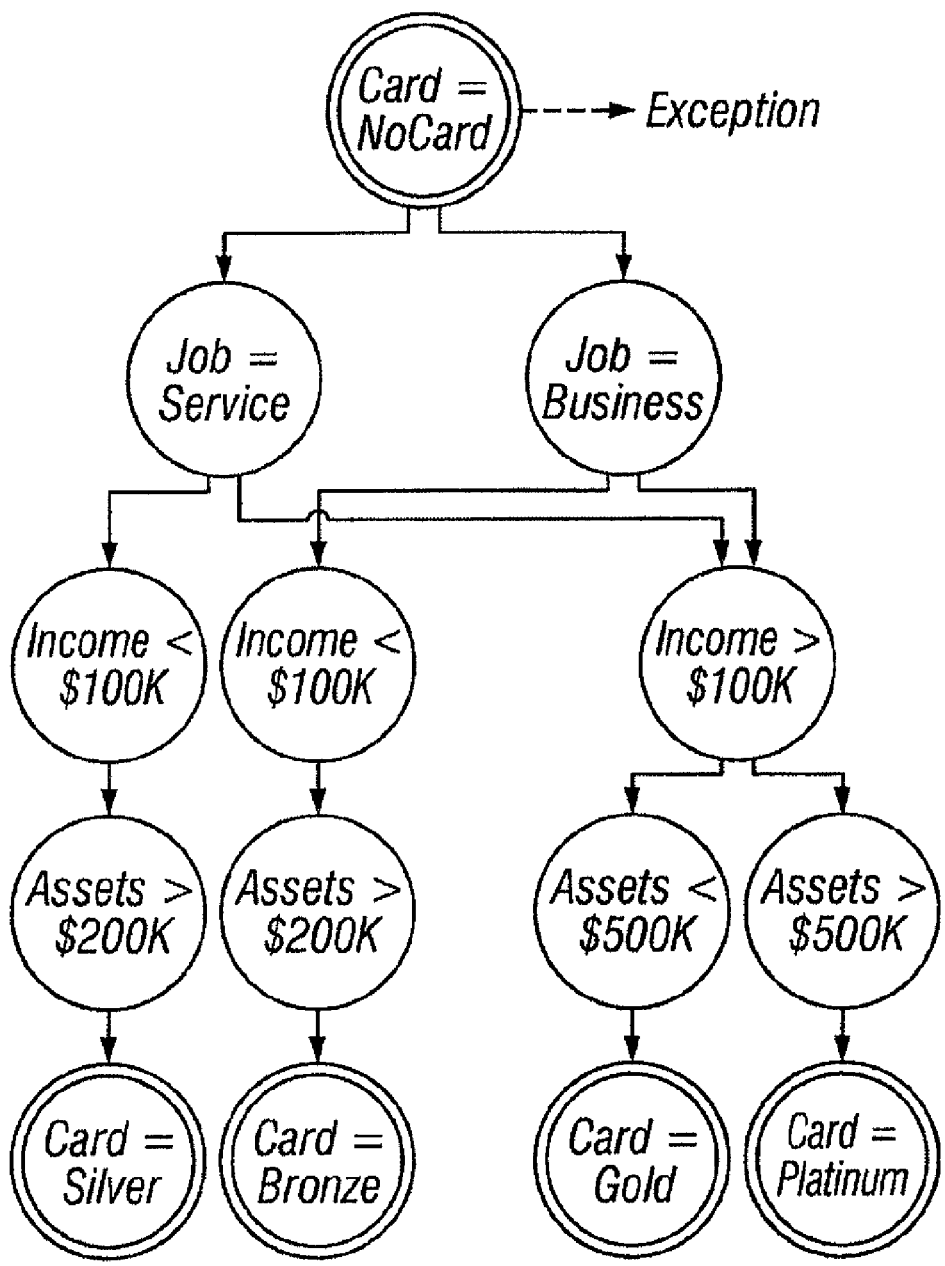
FIG. 11 is an illustration of an optimally ordered EDAG, according to the invention; and, FIG. 12 is a flow diagram of the methodology of the invention.
Figure 12:
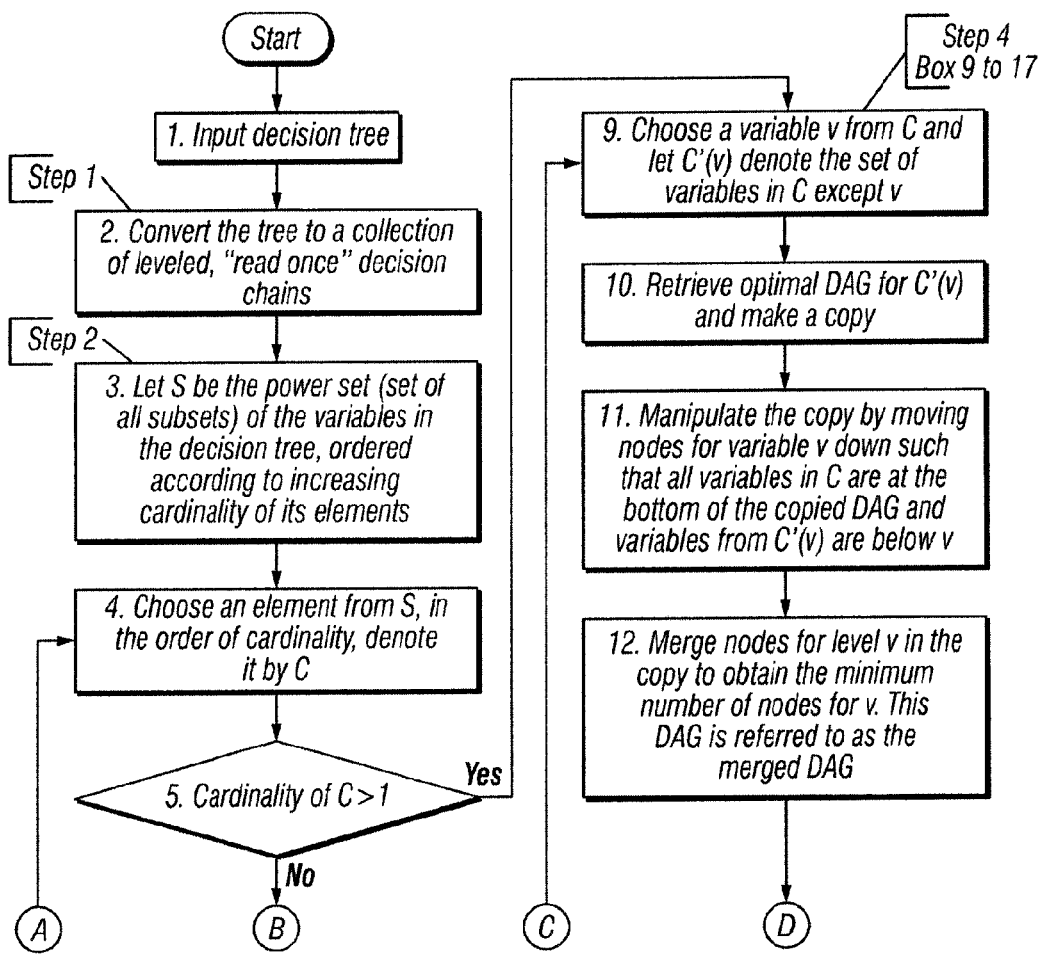
Figure 12:
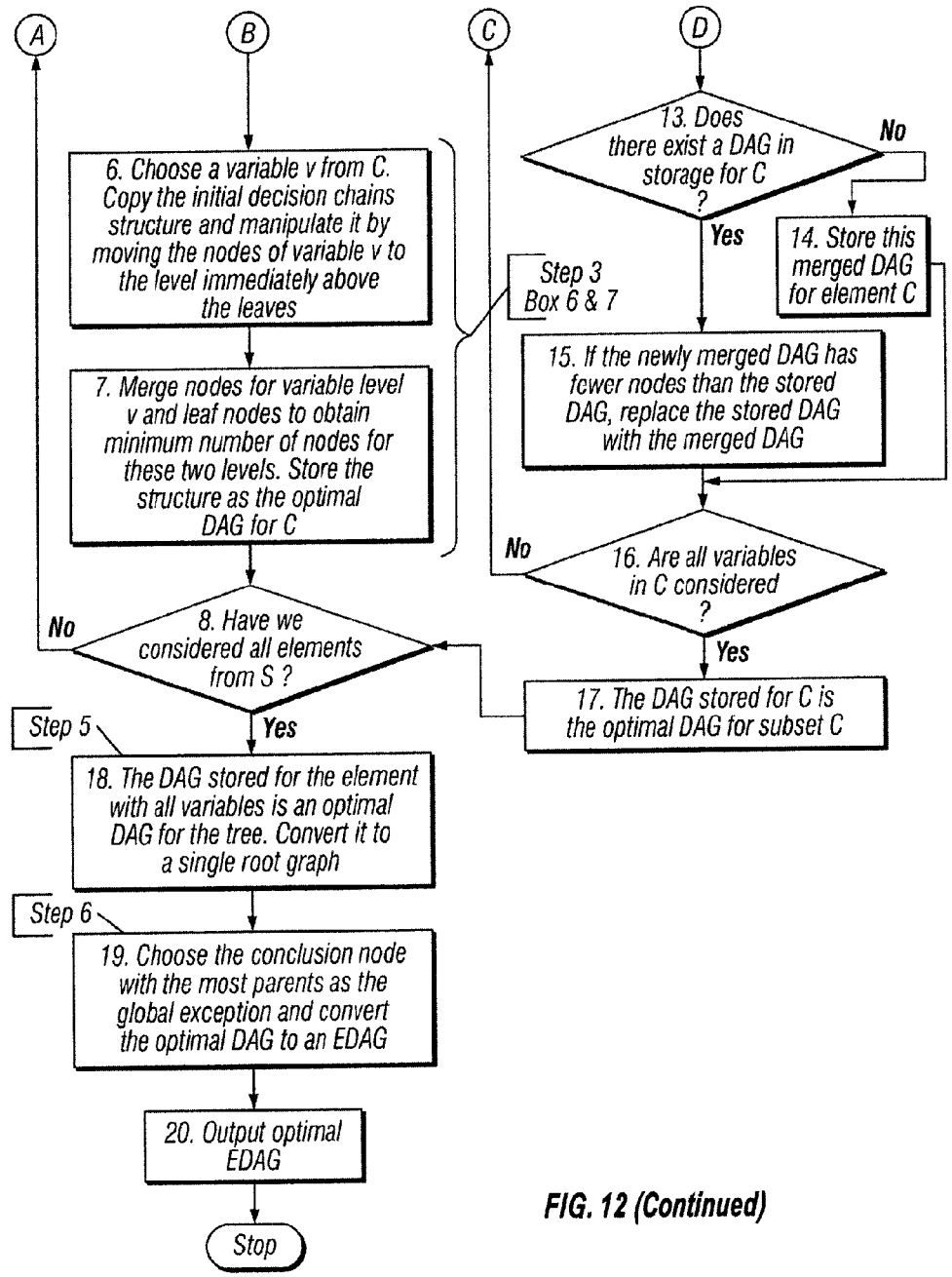

The method of the invention is described via an illustrative example dealing with a decision tree used in determining whether to issue a credit card to an applicant or determining what type of credit card to issue to an applicant. FIGS. 1 through 11 provide a graphical illustration of the various steps of the method of a preferred embodiment of the invention, based on an exemplary input decision tree according to the illustrative example, using a specific set of variables, conditions, values, and, outcomes. FIG. 12 is a flow diagram illustrating the steps of the preferred embodiment of the invention, as applied to any input decision tree.

Figure 1:
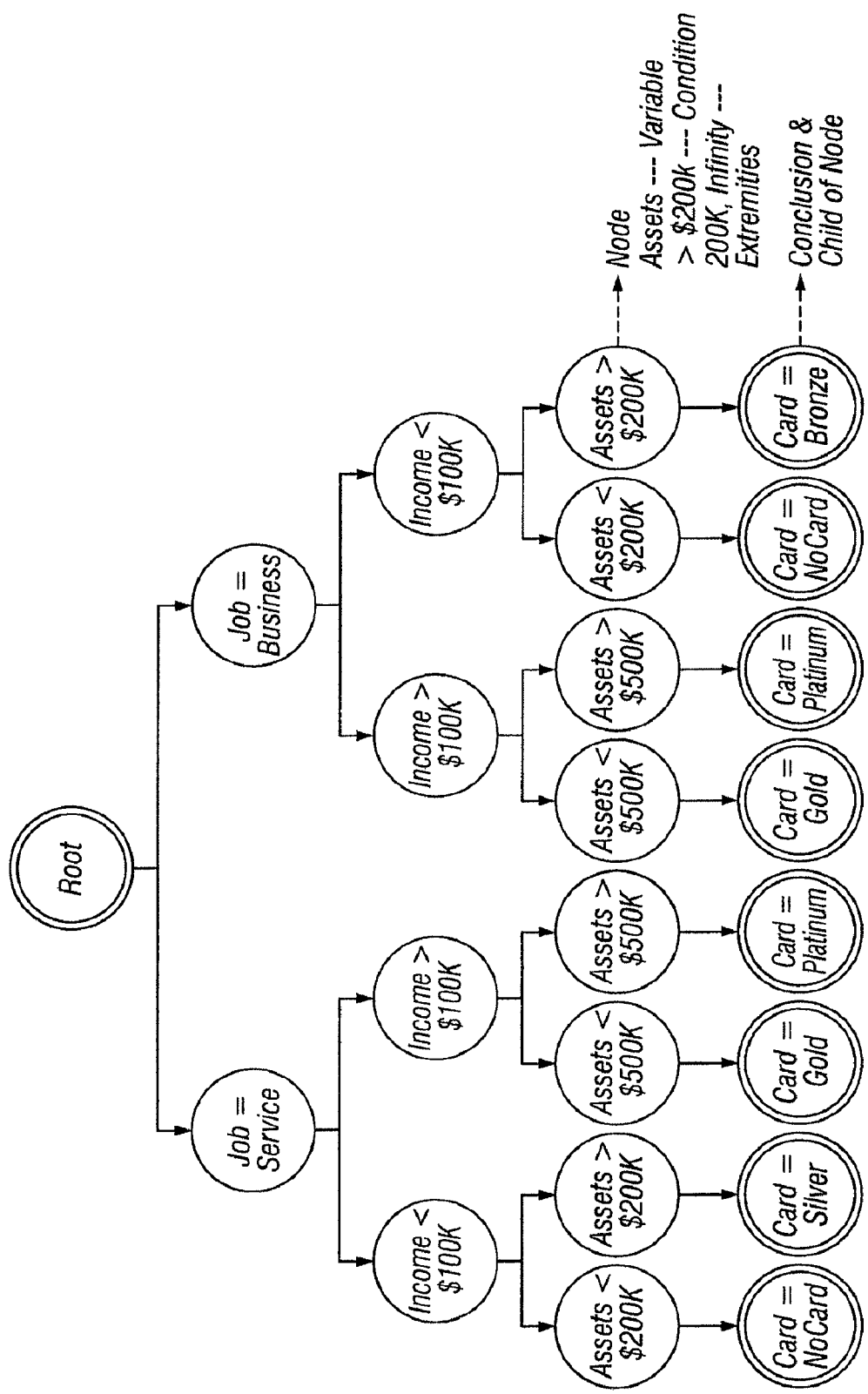
FIG. 1 is an illustration of a typical initial input decision tree processed via the method of the invention.

The exemplary input decision tree of FIG. 1 illustrates the decision process for determining whether a particular type of credit card should be issued to a person, depending on the value of certain variables. The variables, possible values, and outcomes included in the example decision tree of FIG. 1 include:
1. Job: service or business;
2. Income: <$100K or >$100 k;
3. Assets: <$200K or >$200K; <$500 or >$500K
4. Outcomes: NoCard, Silver, Gold, Platinum, Bronze The following detailed description of the invention follows the steps of the method shown in the flow diagram of FIG. 12 while simultaneously referring to application of the method to the example credit card approval case, which is illustrated in FIGS. 1-11.

Although shown in relation to a decision process for determining the type of credit card to issue to an applicant, the present invention is applicable to creating optimal compact representations of other types of tree structures used for other purposes. For example, the present invention can be used to optimize or analyze, among others, dynamic decision trees for predicting outcomes; for determining optimal paths associated with a project plan consisting of various predetermined procedures; for assessing the true and proximate causes of a particular chain of historical events; and, for other knowledge structures which may lend themselves to initial representation in a tree structure.

As shown in FIG. 1, the initial input for the method of the invention is a decision tree. FIGS. 2 through 10 illustrate the various intermediate steps of the method as applied to the example credit card approval case. As shown in FIG. 11, the ultimate optimized output of the method is an EDAG having an optimal order of variables, creating a more comprehensible and compact representation of the original decision tree for presentation to a user. Now, the various steps of the method of a preferred embodiment of the invention are described.

Figure 2:
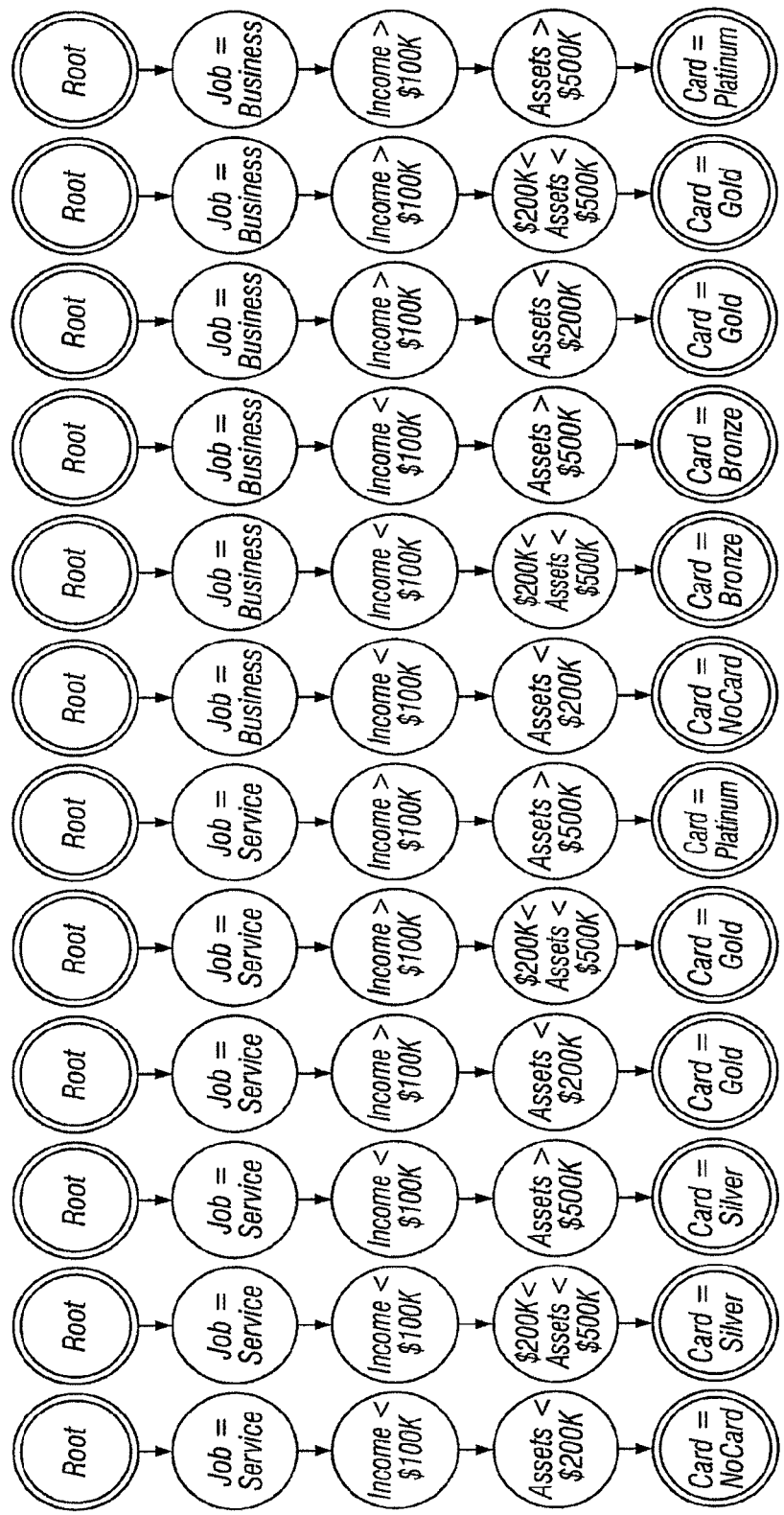
FIG. 2 is an illustration of an expansion of the input decision tree shown in FIG. 1 into a collection of decision chains according to a step of the invention.

Step 1: Convert the input decision tree to a collection of independent Decision Chains having the same length: This entire Step 1 corresponds to Box 2 in the flowchart of FIG. 12. A decision chain is a path from the root of the tree to a leaf node such that each node, except the root, has a single parent and each node, except a leaf, has a single child. The method of the invention generates decision chains, each of which has one and only one node for each variable found in the original input decision tree. If a particular decision chain does not initially have a node corresponding to, for example, variable A, the method inserts a "dummy" or "true" node corresponding to variable A. If a particular decision chain has more than one node corresponding to, for example, variable B, the method merges the conditions for all of those nodes into a single node for variable B. As a result, this first step of the method creates a collection of decision chains, all of which have the same length. In addition, the first step of the method sorts the variables within the decision chains so that the variables in each decision chain appear in the same order. FIG. 2 illustrates the resulting decision chains for the initial decision tree shown in FIG. 1, created by application of this step of the method.

The method of the invention also "normalizes" all the conditions of each variable level used in the decision chains so that every condition is as simple and as unambiguous as possible. The "normalization" procedure may significantly increase the number of decision chains, which also increases memory requirements and computational complexity. The normalization procedure, preserving mutual exclusivity, is described in more detail below. An additional embodiment of the invention is described later which provides an alternative method to minimize memory requirements and computational complexity.

Figure 3:
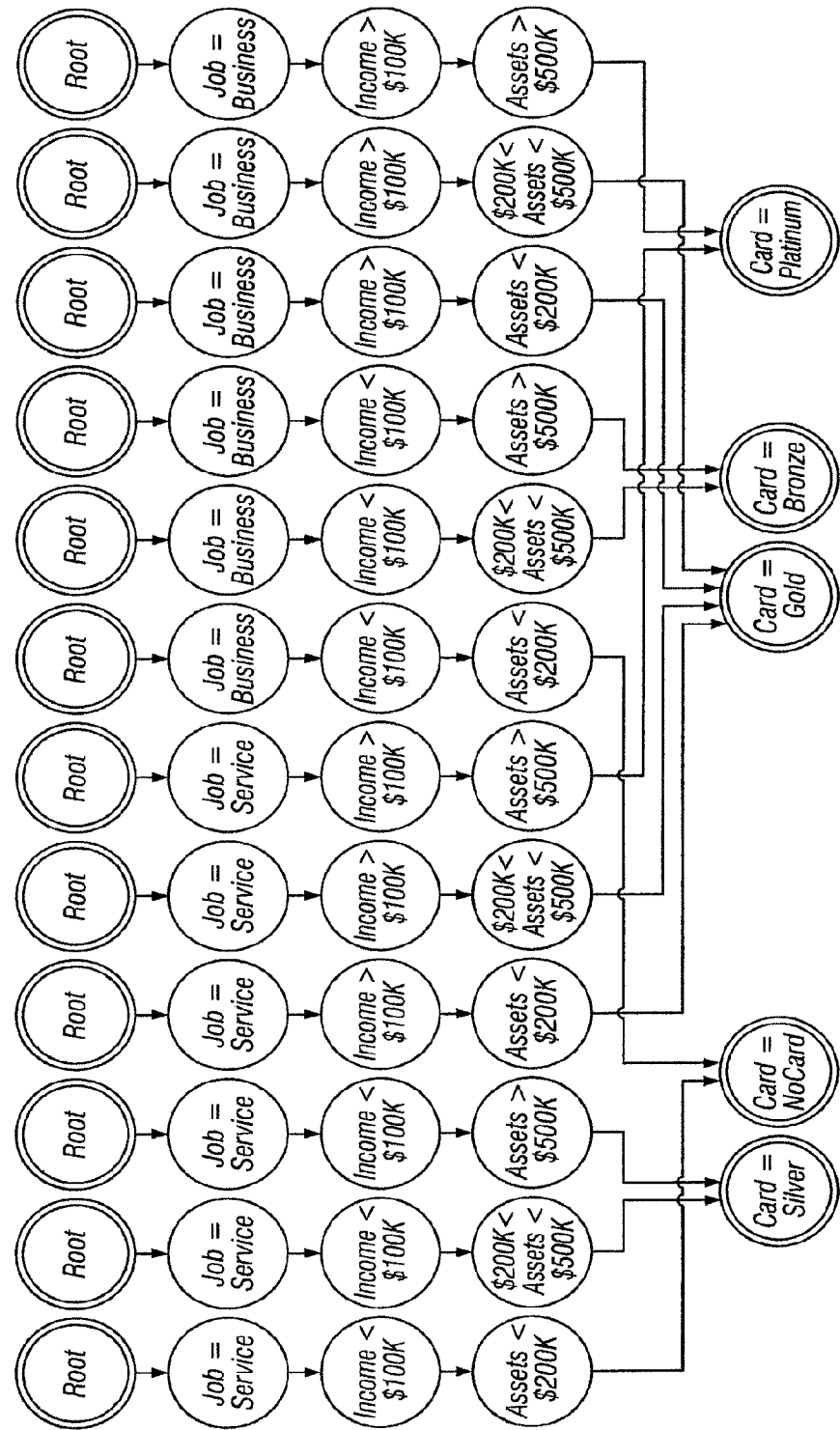
FIG. 3 is an illustration of the merging of action nodes of the collection of decision chains in FIG. 2 according to a step of the invention.

As shown in FIG. 3, after all the leveled decision chains have been created, the method merges, all of the action or outcome nodes, i.e., the leaves, or leaf nodes, to reduce node duplication and to prepare the nodal arrangement for subsequent merging steps. FIG. 3 illustrates the result of merging the action nodes in the example credit card approval case, creating individual action nodes of NoCard, Bronze, Silver, Gold, and, Platinum.

Steps to "normalize" i.e., preserve mutual exclusivity, conditions for a variable level: The following steps normalize the conditions for a variable level:
 a) Every variable takes values from a certain domain. Using the variable conditions found in the original decision tree, partition a variable domain into the smallest possible set of non-overlapping value sets, i.e., a partitioning schema, so that every possible domain value belongs to one and only one value set. For example, the domain of variable Job can be partitioned into two sets: Service and Business; the domain of variable Income can be partitioned into two ranges: Income<100K and Income>100K; the domain of variable Assets can be partitioned into three ranges: Assets<200K, 200K<Assets<500K and Assets>500K.
 b) Examine every condition for each variable level and if a particular condition can be satisfied by a value from more than one value set, replace that condition by a collection of conditions so that there is no value that can satisfy more than one of those conditions. For example, Assets>200K would be replaced with 200K<Assets<500K and Assets>500K.
 c) Replace the decision chain containing the original condition with a set of decision chains that are identical except for each having a different condition on the variable in question. The same procedure is applied to all conditions including "true" nodes and nodes that were created in order to ensure that any given variable only occurred once in a decision chain.

Step 2: Construct an ordered power set: This Step 2 corresponds to Box 3 in the flowchart of FIG. 12. After converting the original input decision tree to a collection of independent decision chains of the same length, the method constructs an ordered power set. A power set, denoted by "S," is a set of all possible subsets of the variables in the original decision tree. The method arranges the elements of S in ascending order of cardinality, i.e., according to the number of elements in the element set, to create an ordered power set. For example, the ordered power set for the set of variables in the example decision tree of FIG. 1 is:

{
 {Job}, {Income}, {Assets},
 {Job, Income}, {Job, Assets}, {Income, Assets},
 {Job, Income, Assets}
}

Step 3: Compute an Optimal Model for each element from S having cardinality of one: This Step 3 is shown as Boxes 6 and 7 in the flowchart of FIG. 12. After constructing an ordered power set, S, the method selects a first element C from S having a cardinality value of one and computes the Optimal Model for that element. Elements in the illustrative example having a cardinality of one include {Job}, {Income}, and {Assets}. Since the cardinality of the selected first element, C, is one, the element contains only one variable v and the Optimal Model is developed according to the following steps:
 3.1 Create a copy of the decision chain set structure and manipulate it by moving the nodes of the variable v to the bottom level of the decision chain set structure, just above the leaves, i.e., the action or outcome nodes.

Figure 4:
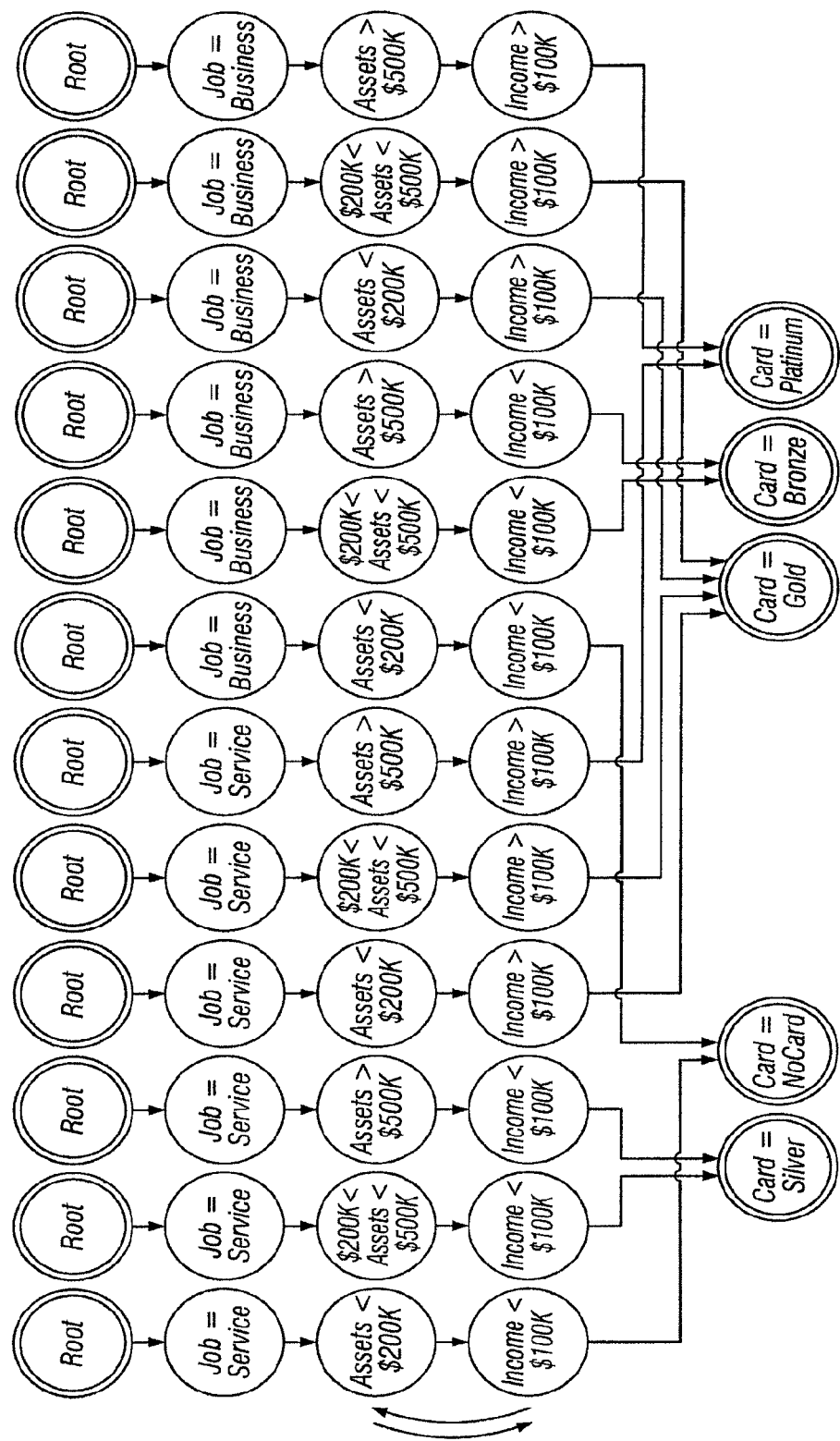
FIG. 4 is an illustration of the rearrangement of nodes of the illustration in FIG. 3 according to a step of the invention.

FIG. 4 illustrates this step as applied to the example case, where v=Income and where the nodes of the level corresponding to, Income are moved below the level corresponding to Assets, to just above the action leaves, which determine the type of Card issued to an applicant.
 3.2 Merge the nodes at the leaf level and the level with variable v to obtain the minimum number of nodes on those two levels. Refer to the section below, Description of Merging Procedures, for detailed merging steps.

Figure 5:
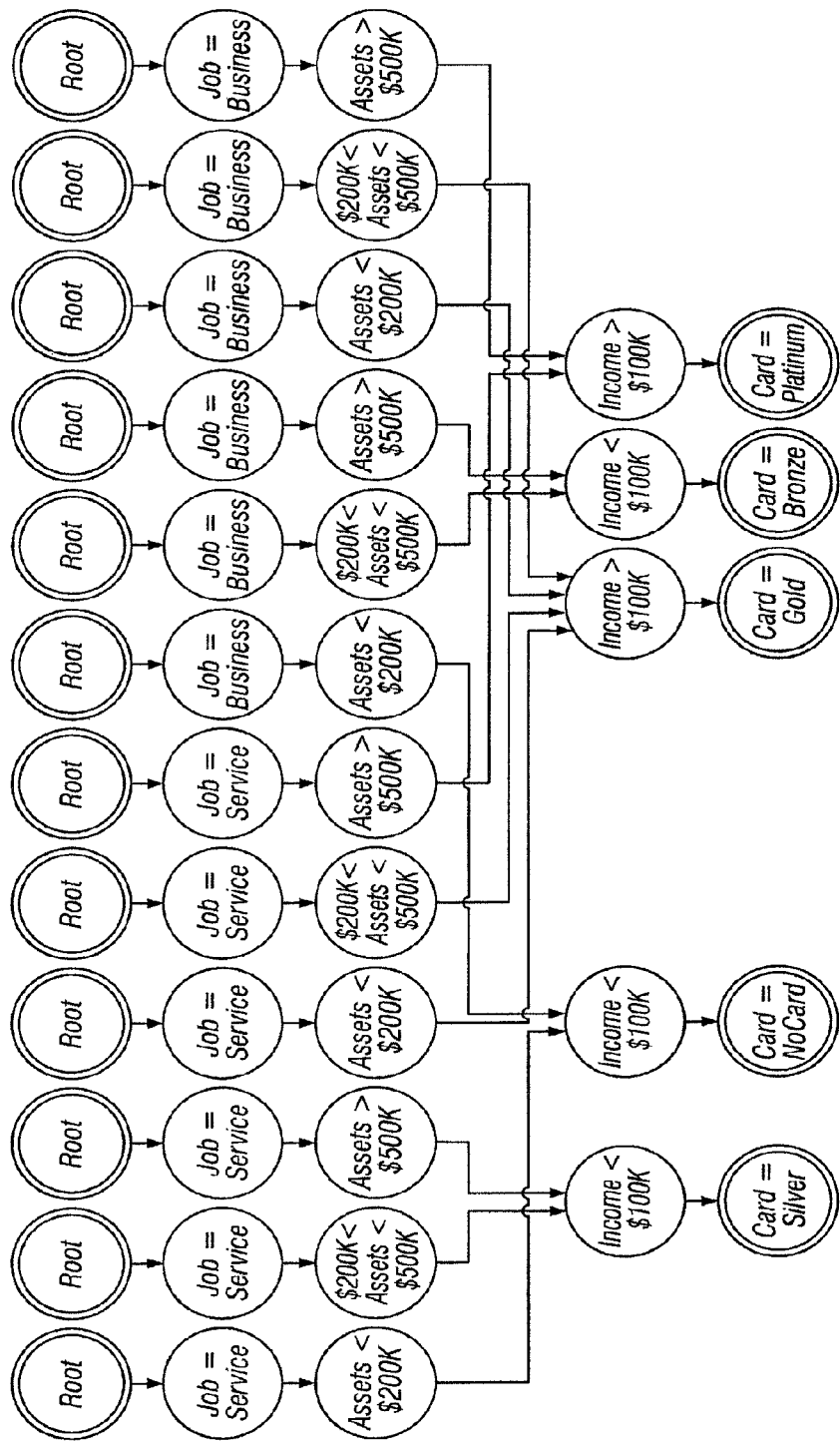
FIG. 5 is an illustration of the merger of the rearranged nodes of FIG. 4 to remove identical subtrees, according to a step of the invention.
Figure 6:
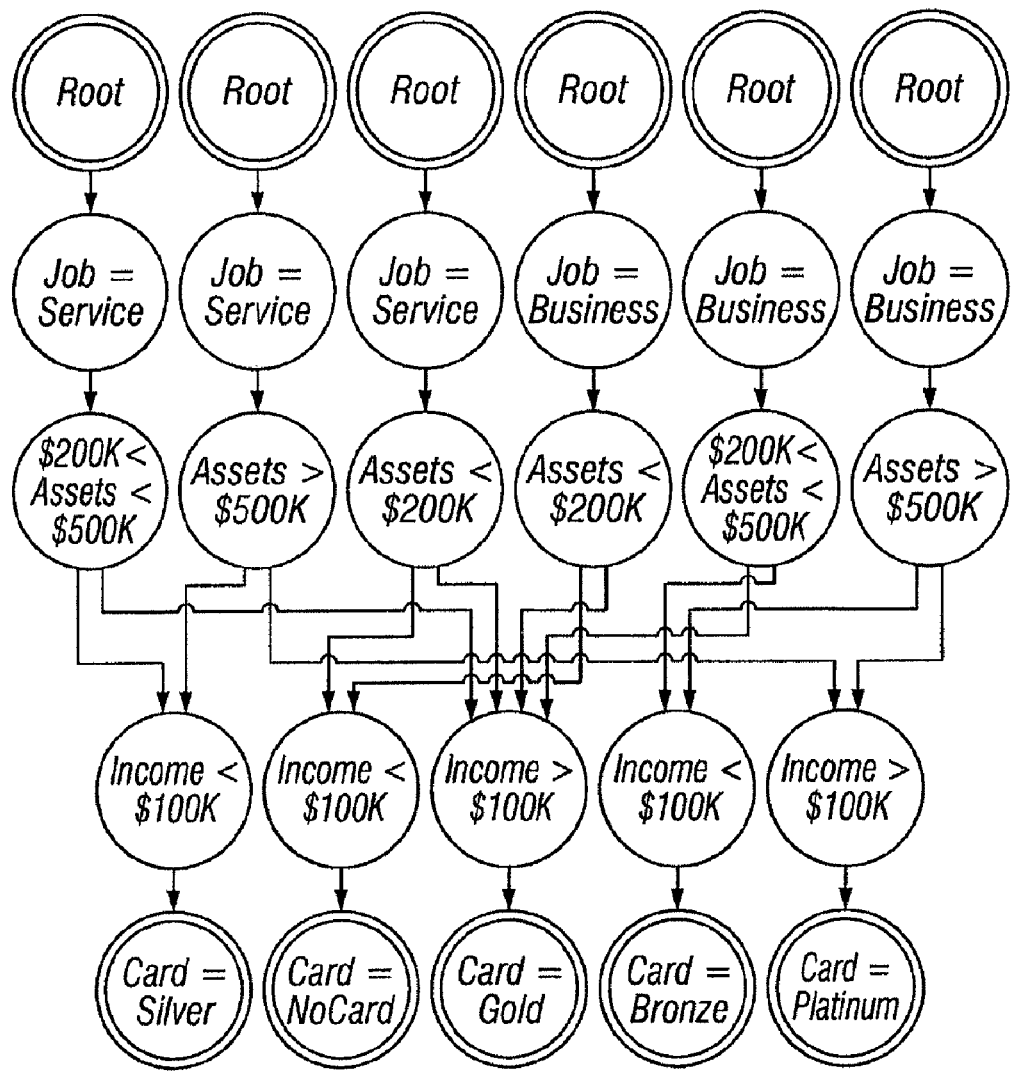
FIG. 6 is an illustration of a merged model of the nodes of FIG. 5, according to the invention.

FIGS. 5 and 6 illustrate these steps as applied to the example credit card approval case. As shown in the transformations from FIG. 4 to FIG. 5 and then FIG. 6, the node count and number of decision chains continues to be greatly reduced by the application of the method of the invention.

This newly created structure is the Optimal Model for element C, having a cardinality of one, which is placed into memory storage for further use. The method then computes the Optimal Model for all other elements of cardinality one, and stores each result in memory. For the example case, optimal models for {Income}, {Job}, and {Assets} are each placed into memory storage.

Description of the Merging Procedures

Figure 8:
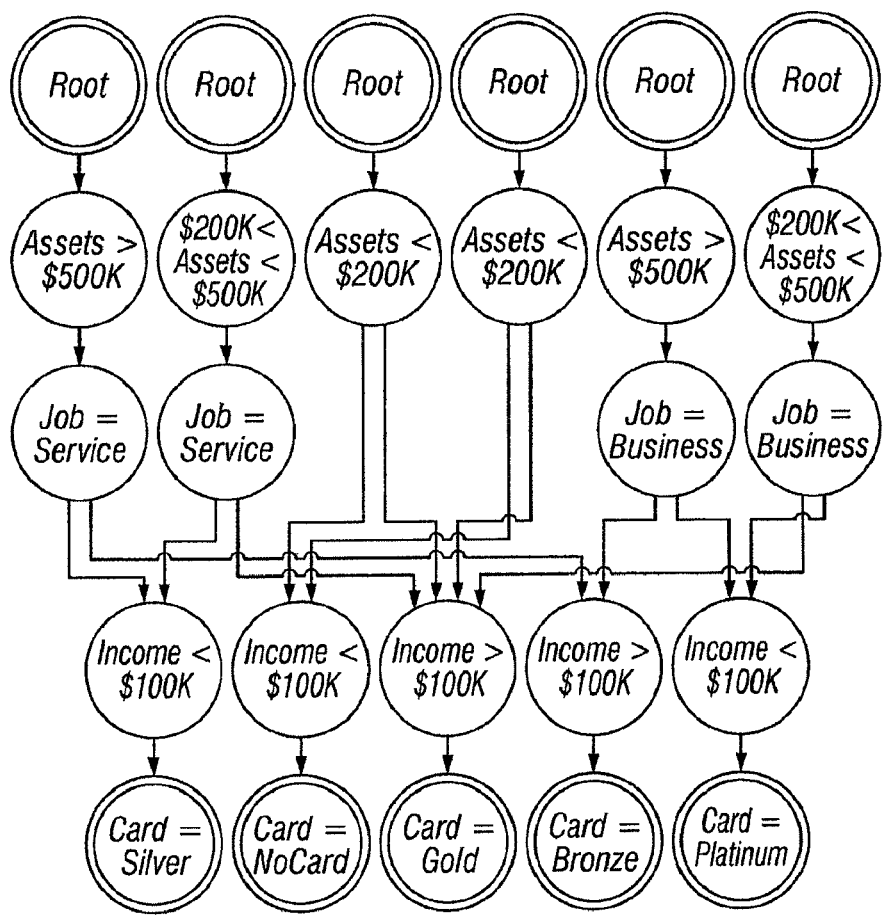
FIG. 8 is an illustration of the merger of nodes of the nodal rearrangement of FIG. 7, according to a step of the invention.

Redundant nodes of variable v are merged to keep the resulting graphic structure as compact as possible, according to two primary methods:
 1. Each node with variable v sharing the same child and the same condition is merged to a single node with that same condition and pointed to by all of the parents of the nodes being merged. FIG. 5 illustrates this merging method for nodes of variable "Income," based on the example case.
 2. Each node of the variable v having the same children and the same ancestors, not just immediate parents, in the decision chains is merged. The nodes of v are replaced with a single node with a complex condition that is a union of conditions from the nodes being merged. The condition of the merged node has to evaluate to "true" for all the values that evaluate to "true" for the nodes being replaced. If the new, complex, condition of the merged node covers the whole domain, then it is a "true" node. True nodes for variable v can be deleted and their parents shall instead point to the children of the true node. FIG. 8 illustrates this merging method where true nodes of the variable "Job" are removed.

Merging also takes place in the decision chains above nodes of variable v. Multiple occurrences of exactly identical decision chains, i.e., the upper, still un-merged parts, are removed; and outgoing arcs are drawn to the all of the children of removed parts. FIG. 6 illustrates this process for the example credit card approval process case.

Step 4: Compute an Optimal Model for all element sets with cardinality greater than one: This Step 4 is shown as Boxes 9 to 17 in the flowchart of FIG. 12. After computing an Optimal Model for each element of cardinality one, the method proceeds to compute an Optimal Model for all element sets having cardinality greater than one. In the illustrative example, there are element sets having cardinality values of two and three. First, an element C having cardinality greater than one is selected from S in the order of cardinality and the Optimal Model is computed for that element. Since the cardinality of C is greater than one, the element contains more than one variable, and the Optimal Model is determined as follows:

Step 4.1: Choose a variable v from the subset element C. Let all the remaining variables in C except v be called the complimentary set of v, denoted by C' (v). For the example case, where the subset element C having a cardinality of two is {Job, Income}, v is Job and C' (v)={Income}

Step 4.2: Retrieve the Optimal Model for the complementary set C' (v) from memory storage and make a copy of it. Since element C is chosen in order of cardinality, the method ensures that the optimal structure for C' (v) has already been calculated. For the example case, the optimal model copied from memory storage is for C' (v)={Income}.

Step 4.3: Move the nodes for variable v (Job) in the copied model downward in each decision chain until all of the nodes corresponding to the remaining variables in C' (v) {Income} are below nodes for variable v (Job) and all of the nodes for variables not in C {Assets} are above the nodes for variable v (Job).

Figure 7:
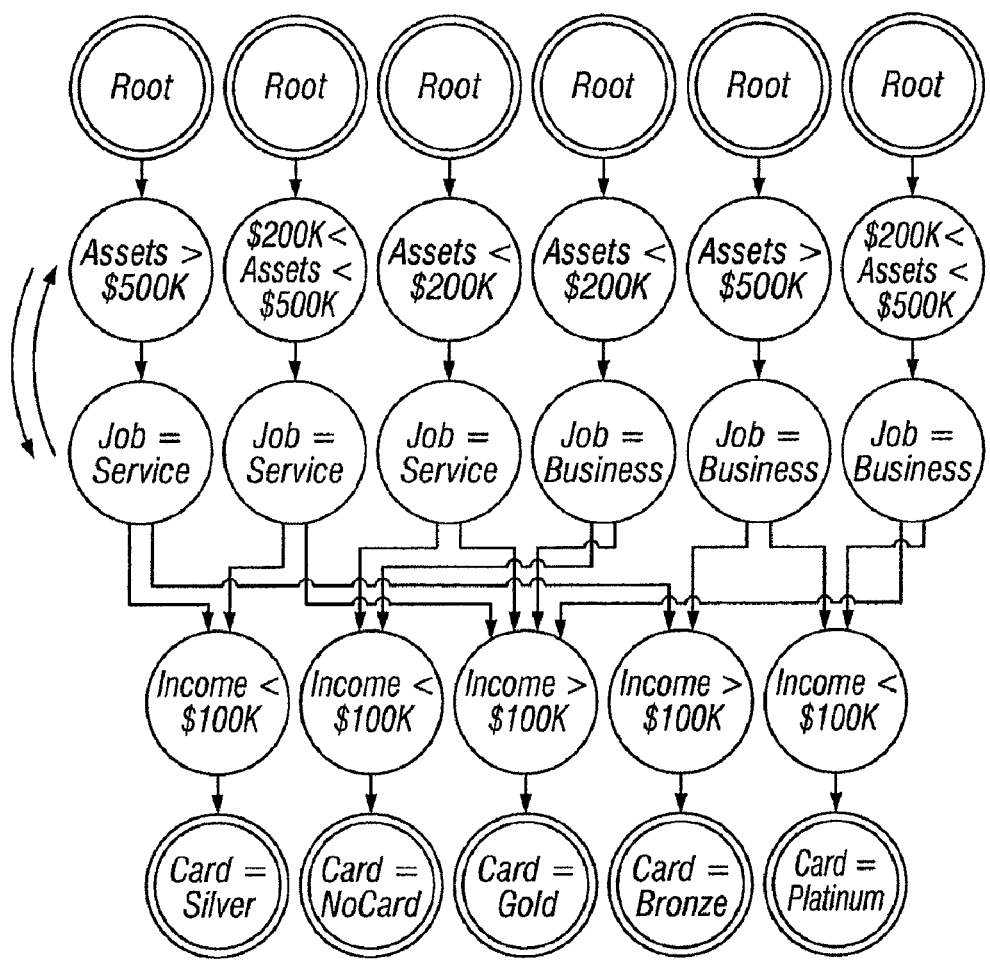
FIG. 7 is an illustration of a nodal rearrangement of the nodes in FIG. 6, according to a step of the invention.

FIG. 7 illustrates this step of the method of the invention as applied to the example case.

Step 4.4: Simplify the nodal structure to create a merged model by merging redundant nodes of variable v according to the previously described merging procedures, in the section, Description of Merging Procedures, described above.

Step 4.5: For the merged model created in step 4.4, compute the number of nodes on levels corresponding to variables from subset element C. Check memory storage for an available model for subset element C. If an available model does not exist in memory storage, place the merged model created in Step 4.4 in memory storage. If a stored model does exist, determine if the stored model has more nodes than the current merged model on the levels corresponding to variables from subset element C. If the stored model has more nodes, replace the existing model in memory storage with the current merged model.

Figure 9:
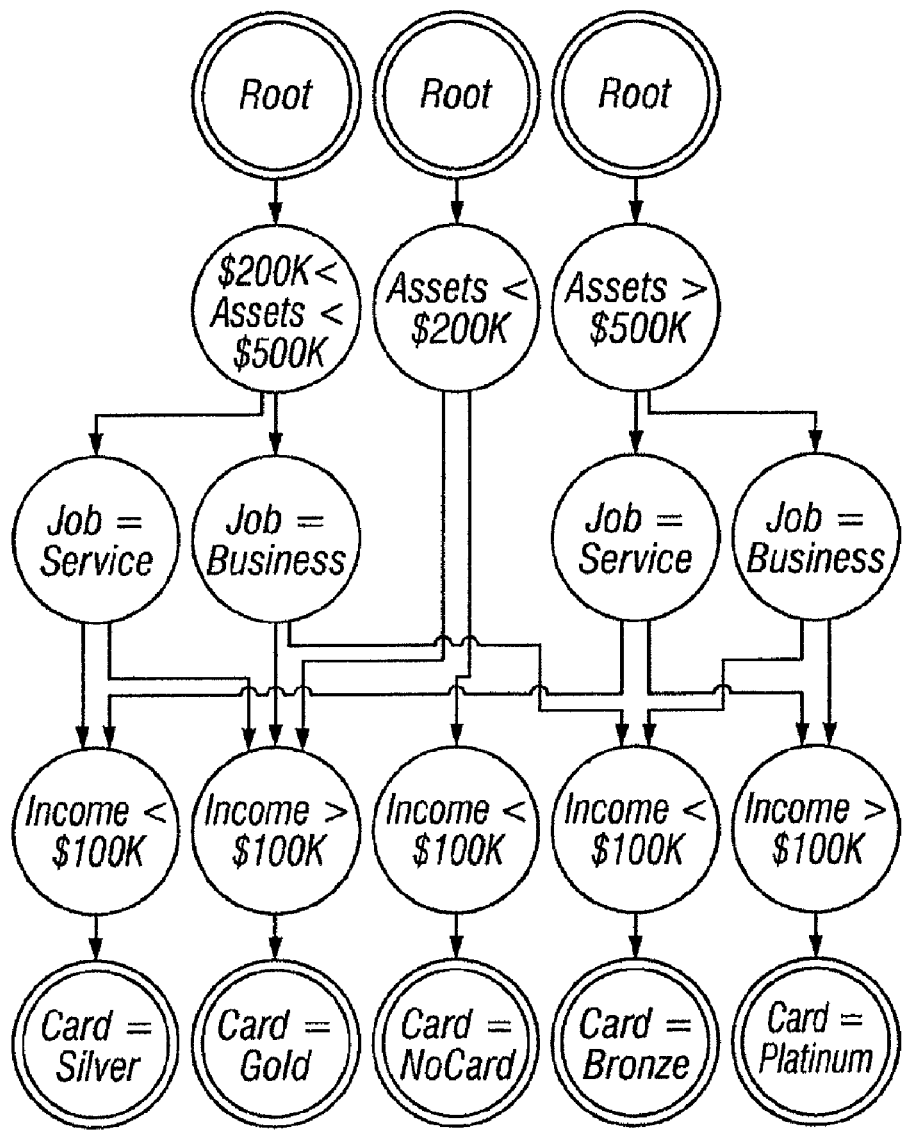
FIG. 9 is an illustration of a merged model of the nodal arrangement of FIG. 8, according to a step of the invention.

FIGS. 7, 8 and 9 show application of the above substeps to the example credit card case for a subset element C={Job, Income} where the chosen variable v is Job.

Step 5: Select Optimal Model and restore single root node: Step 5 is shown as Box 18 in the flowchart of FIG. 12. In the process of computing the optimal order for all the elements of the ordered power set, S, a set containing all the variables of the original tree is eventually' chosen. The stored model for that set is the overall Optimal Model. The overall Optimal Model is selected and the multiple root nodes are merged to a single root node. FIG. 10 illustrates the Optimal Model for all variables, based on the example credit card case.

Step 6: Select the Global Exception and create the EDAG: This Step 6 is shown as Box 19 in the flowchart of FIG. 12. From the Optimal Model for the entire set of variables selected in Step 5, select the leaf node having the maximum number of parent nodes, and declare that node to be the global exception. Remove all nodes that are parents of the global exception node from the Optimal Model along with all edges connected to those nodes. Place the global exception node at the root of the overall tree structure. FIG. 11 illustrates the application of Step 6 to the example credit card approval case where the global exception node has been computed as the NoCard node. In this particular example, all leaf nodes happen to have the same number of parents and so a leaf node is selected arbitrarily.

Consequently, the original input decision tree has been converted to an optimal, compact representation in the form of an optimized and minimized exception-based directed acyclic graph where the entire knowledge structure of the original input decision tree has been retained. Having thus developed an optimized, compact representation, a user can more easily comprehend and interact with the knowledge structure.

Low Memory Method: The method described in Steps 1 though 6 uses a decision chain set structure such that the merged variables are represented as a DAG and un-merged variable levels are represented as decision chains. Because of the normalization procedure described earlier, decision chains can have many redundant nodes and edges, leading to high memory requirements. Consequently, in an additional embodiment of the invention, we describe a low memory method that represents un-merged variable levels as a DAG instead of decision chains. This method is similar to the method described above in Steps 1 through 6, except for the following changes:

In Step 1, the input decision tree is converted to a directed acyclic graph, i.e., a "DAG," as follows:
  a) A collection of leveled, read-once decision chains is created and normalized, as described for Step 1 of the original method.
  b) Starting from the leaf nodes and moving toward the root, the nodes are merged level by level according to the methods described above in the section, Description of Merging Procedures. This results in a leveled, read-once DAG.

The DAG structure reduces memory consumption, but adds the additional requirement of performing "local" normalization and simplification steps during each level manipulation. In step 3, when moving nodes of variable v to just above leaf nodes and in step 4, when moving nodes of variable v to just above the nodes of the variables in C' (v), the movement has to take place one level at a time, rather than movement directly across multiple levels, as is done in the first embodiment of the invention described above. Local normalization and simplification proceed according to the following steps:
  a) The nodes of variable v are interchanged with the child level, c. The child level, c, is the level just below the level of the nodes of variable v. Copies of the nodes of variable v and child nodes c are made such that there is a one-to-one relation between all nodes of the variables v and c. Then, the nodes of variable v are interchanged with the child nodes c.

b) The mutual exclusivity for variable level, c, is maintained, as described above, in the section, "Steps to "normalize" i.e., preserve mutual exclusivity, conditions for a variable level".

c) The nodes of level v and c are merged according to the methods described above in the section, Description of Merging Procedures. For all the nodes of variables v and above, during merging methods, refer to only the immediate parent node instead of the entire decision chain above that node.

d) Repeat steps a) to c) until all the nodes of variable v are pointing to only nodes of variables in C'(v).

Figure 13A:
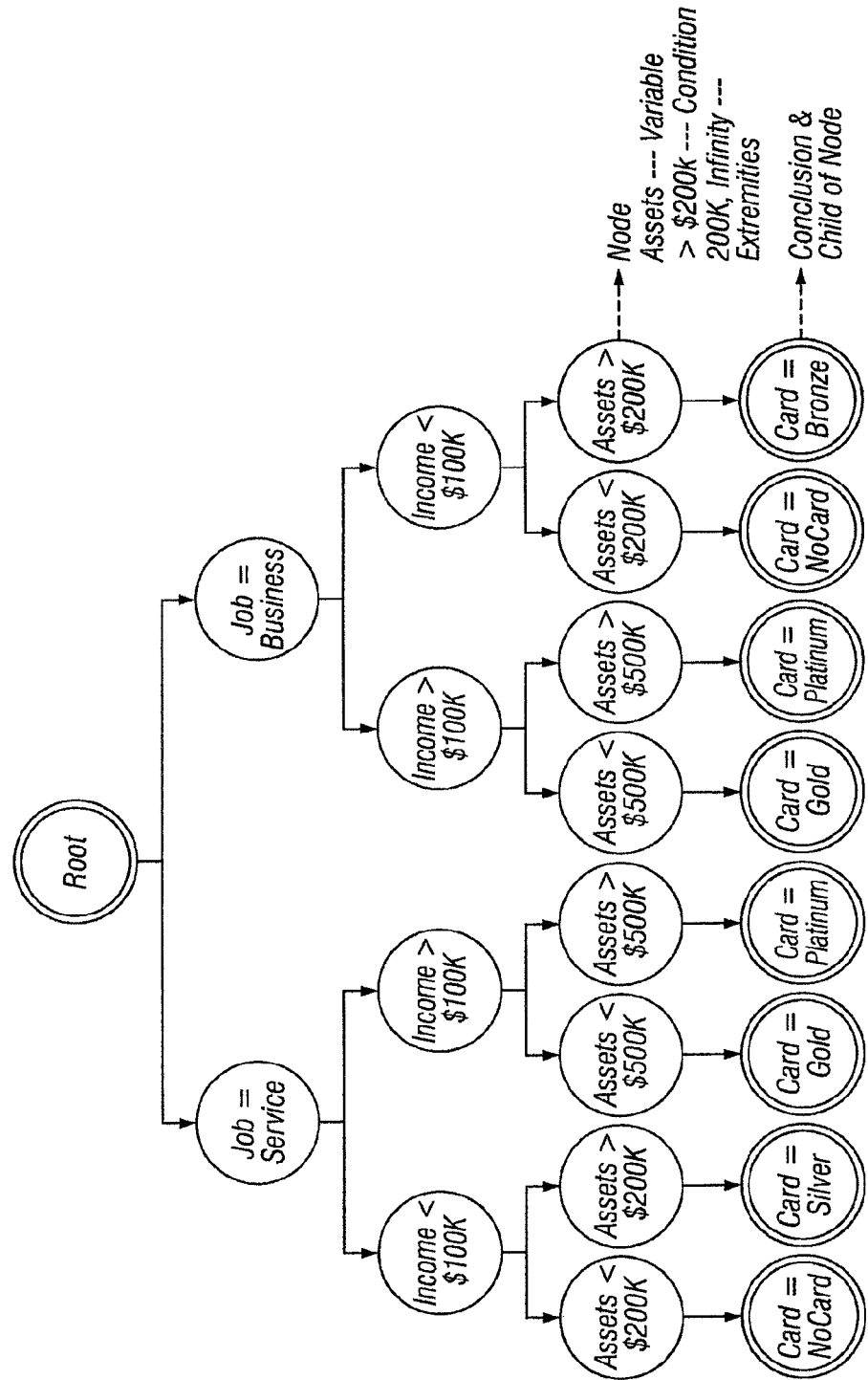
FIGS. 13A and 13B illustrate, respectively, the input decision tree having 23 nodes of the credit card approval example transformed into an output EDAG having 14 nodes, according to the methodology of the invention.
Figure 13B:
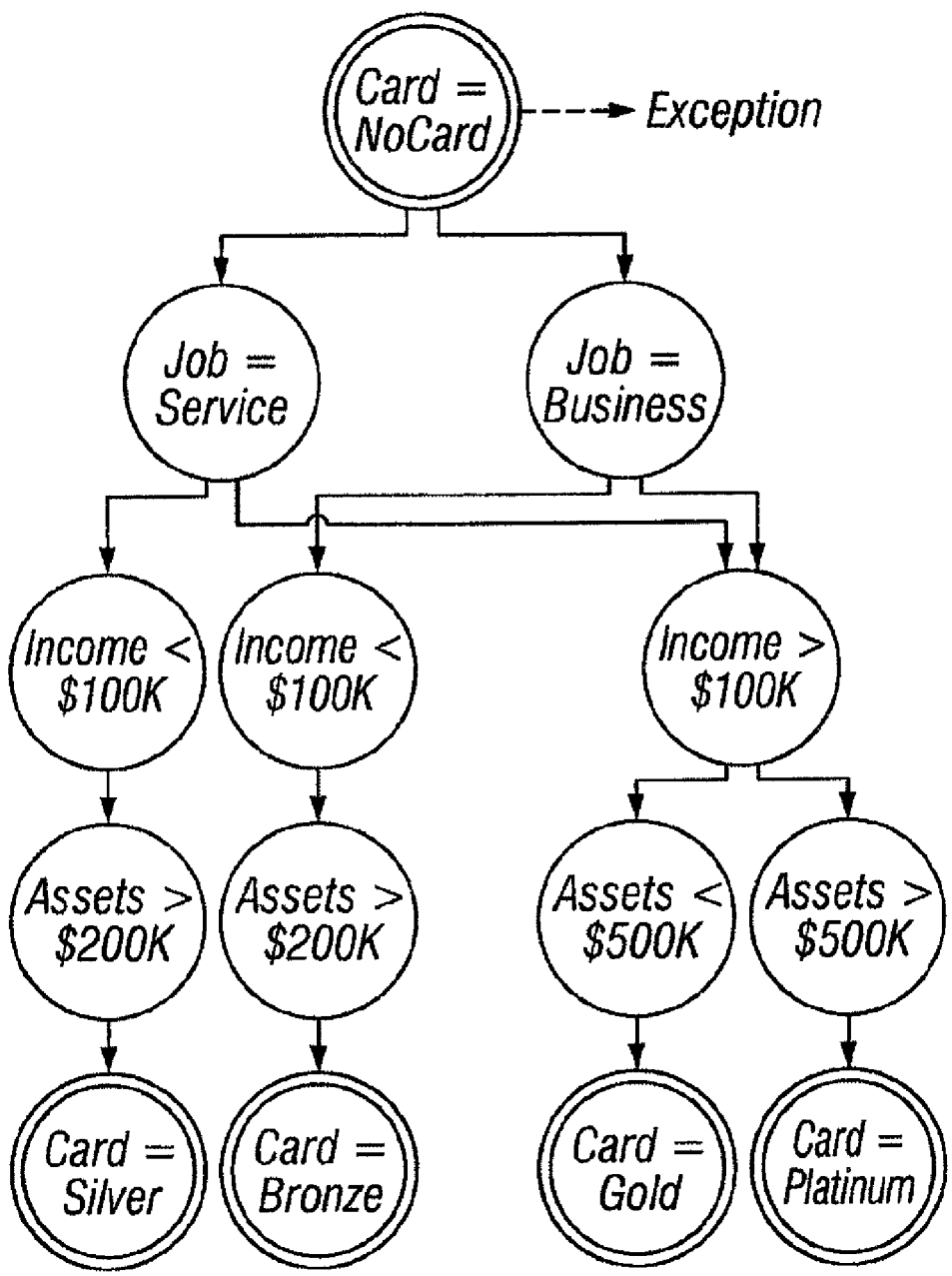

When applied in practice, the invention significantly simplifies the graphic structure displayed to a user. For example, FIGS. 13A and 13B illustrate the input decision tree and output EDAG of the credit card approval example. The input decision tree in FIG. 13A contained 23 nodes; the corresponding output EDAG in FIG. 13B contained only 14 nodes, representing an approximate 39% reduction in size and complexity.

Figure 14A:
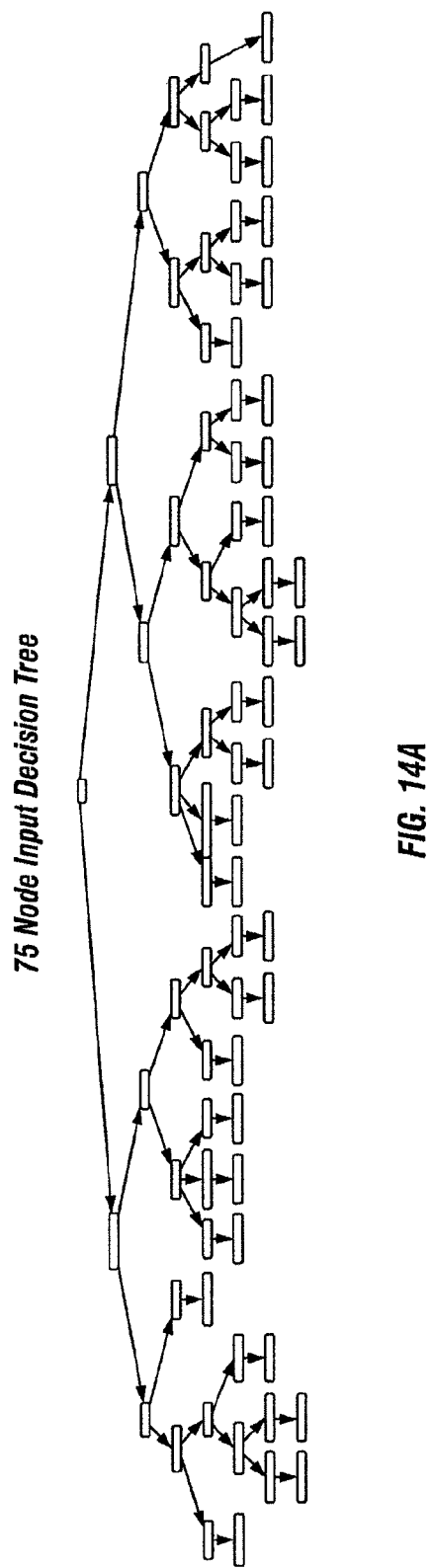
FIGS. 14A and 14B illustrate, respectively, an input decision tree having 75 nodes transformed into an output EDAG having 18 nodes, according to the methodology of the invention; and, FIGS. 15A and 15B illustrate, respectively, an input decision tree having 125 nodes transformed into an output EDAG having 23 nodes, according to the methodology of the invention.
Figure 14B:
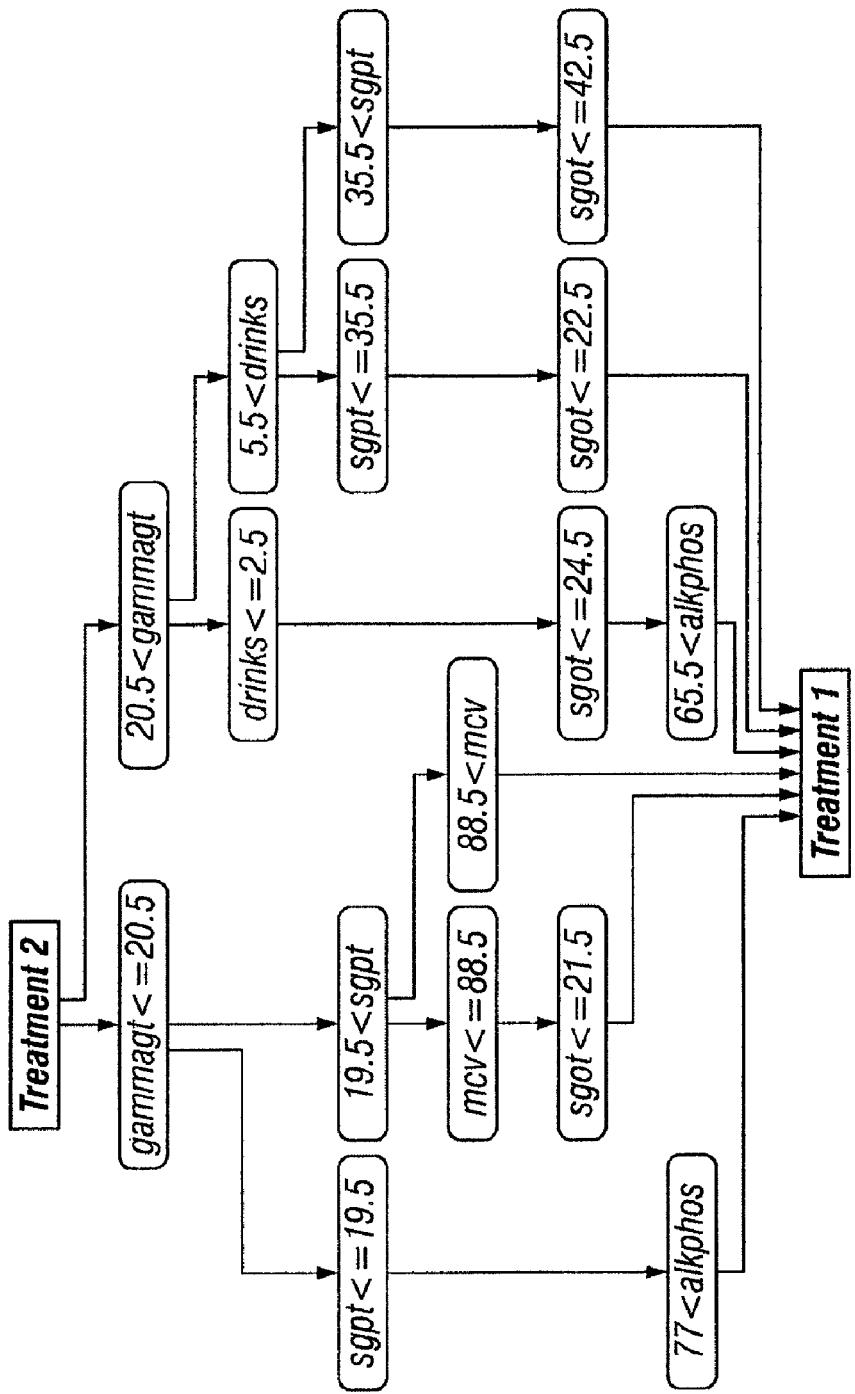

As the size and complexity of the input decision tree increases, the impact of the application of the invention is even more dramatic. For example, FIGS. 14A and 14B illustrate another example of the ability of the present invention to transform a large complex, decision tree into a compact representation of the same knowledge. In this case, the input decision tree in FIG. 14A contained 75 nodes; the corresponding output EDAG in FIG. 14B contained only 18 nodes, representing an approximate 76% reduction in size and complexity.

Figure 15A:
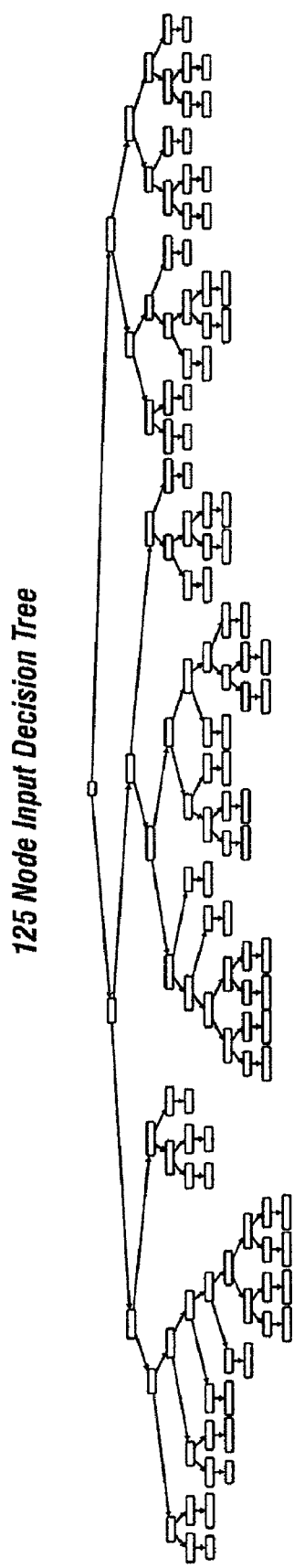
Figure 15B:
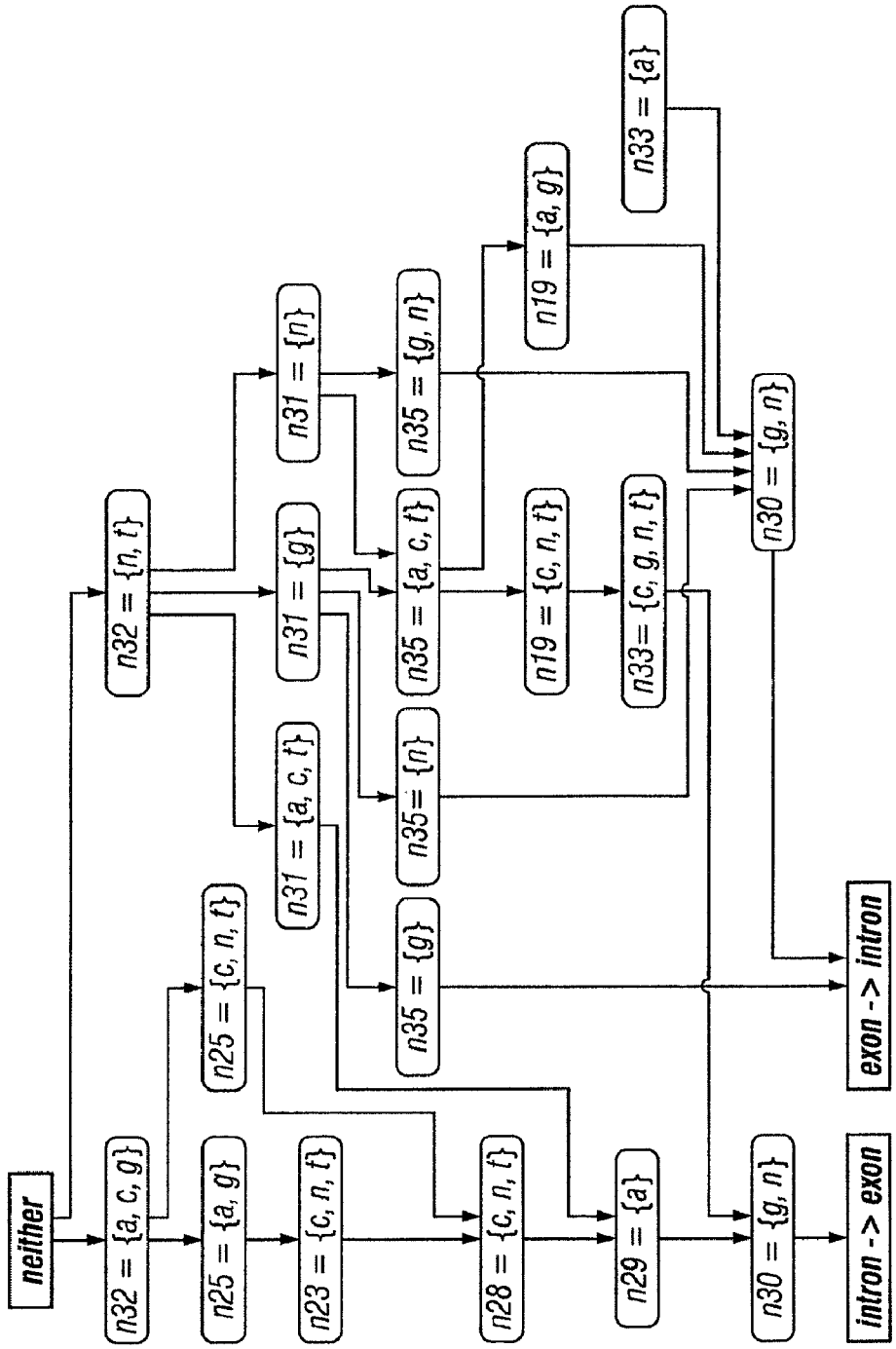

FIGS. 15A and 15B illustrate another example of the ability of the present invention to transform a large complex, decision tree into a compact representation of the same knowledge. In this case, the input decision tree in FIG. 15A contained 125 nodes; the corresponding output EDAG in FIG. 15B contained only 23 nodes, representing an approximate 82% reduction in size and complexity.

As can be seen by the above description and presentation of the tangible results associated with the invention, the invention provides a useful and computationally tractable means by which complex and confusing decision trees can be transformed into a smaller, simpler, and more comprehensible format, which will ease understanding and utility of the knowledge represented by the initial input decision tree.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented method comprising:
   transforming a decision tree into an optimal compact representation, the decision tree having a plurality of variables, a root node, intermediate nodes, and leaf nodes, the decision tree being a leveled, read-once decision tree; and
   displaying the optimal compact representation of the decision tree;
   wherein the transforming comprises:
      converting the leveled, read-once decision tree into a collection of independent decision chains, each of the independent decision chains having one level for each variable and wherein the variables are arranged in the same order, thereby creating a decision chain set structure;
      computing an ordering of variables in the decision chain set structure to result in a directed acyclic graph with a minimum number of nodes; and
      converting the directed acyclic graph into an exception-based directed acyclic graph with a single exception to result in the optimal compact representation.

2. A method as in claim 1, wherein the transforming further comprises:
   normalizing the decision chain structure and merging leaf nodes.

3. A method as in claim 2, wherein the transforming further comprises:
   constructing an ordered power set from the plurality of variables to form elements comprising one or more variables.

4. A method as in claim 3, wherein the transforming further comprises:
   constructing an ordered power set from the plurality of variables to form elements comprising one or more variables.

5. A method as in claim 4, wherein the transforming further comprises:
   computing an optimal model graph for each element of the ordered power set having cardinality of one;
   computing an optimal model graph for each element of the power set having cardinality greater than one;
   selecting an optimal model graph for an element of the power set containing all variables;
   transforming the selected optimal model graph to an optimal model graph having a single root node; and
   selecting a global exception from the optimal model graph having a single root node.

6. A method as in claim 5, wherein computing an optimal model graph for all element sets having a cardinality greater than one further comprises:
   selecting and removing a variable from each element to form a complimentary corresponding subset comprised of remaining variables of the element;
   retrieving a previously computed optimal model graph for the complementary subset from storage and making a copy of the optimal model graph of the complementary subset;
   moving all nodes for the selected variable in the copied optimal model graph downward in each decision chain until all nodes corresponding to remaining variables in the complementary subset are below nodes for the selected variable and all nodes for variables not in the element are above nodes for the selected variable;
   simplifying a nodal structure of the of the copied optimal model graph by merging redundant nodes of the selected variable to create a merged model;
   computing the number of nodes on levels corresponding to variables from the element;
   checking storage for an available model for the element;
   if an available model does not exist in storage, placing the merged model in memory storage;
   if a stored model does exist, determining if the stored model has more nodes than the current model on the levels corresponding to variables from the element; and
   if the stored model has more nodes, replacing the existing model in storage with the current model.

7. A method as in claim 5, wherein computing an optimal model graph for each element having a cardinality of one, further comprises:
   creating a copy of the decision chain set structure;

manipulating the decision chain set structure by moving all nodes of a selected variable to a lower level of the decision chain set structure, just above a level of the leaf nodes;

merging the selected variable nodes to minimize the number of nodes; and repeating creating, manipulating, and merging for the remaining elements having a cardinality of one.

8. A method as in claim 6, wherein simplifying the nodal structure by merging redundant nodes of the selected variable to create a merged model further comprises:

identifying nodes of the selected variables having identical conditions and identical child nodes; and merging nodes of the selected variables having identical conditions and identical child nodes to a single node.

identifying nodes of the selected variables having same ancestors and identical child nodes;

replacing nodes of the selected variable having same ancestors and identical child nodes with a single node having a complex condition comprising a union of conditions from the selected variable nodes being replaced;

identifying identical decision chains above the selected variable;

selecting just one decision chain out of multiple identical chains and removing the additional identical decision chains; and pointing the child nodes of the removed decision chains by the one selected decision chain.

9. A method as in claim 8, wherein the complex condition of the merged node covers the entire domain of the variable and evaluates to "true" for all values that evaluate to "true" for the nodes being merged, the method further comprising deleting true nodes for the variable such that parent nodes of the true node point to the corresponding children of that true node.

10. A method as in claim 1, further comprising:

normalizing the decision chain structure and merging any identical chains starting from the leaf nodes and merging level by level for all identical chains such that the entire decision chain structure is merged to a directed acyclic graph; and moving all nodes of a selected variable to a lower level one level at a time.

11. A method as in claim 10, wherein moving all nodes of a selected variable to a lower level one level at a time comprises:

copying and duplicating selected variable nodes and corresponding child nodes such that there is a one-to-one relation between all nodes of the selected variable and all corresponding child nodes;

interchanging the selected variable nodes with the child nodes;

maintaining mutual exclusivity for the child nodes;

merging nodes at the selected variable level and corresponding child level but referring only to immediate parent nodes instead of the entire decision chain above that node; and repeating copying and duplicating, interchanging, maintaining, and merging until all selected variable nodes are pointing only to nodes of remaining variables in the complementary subset.

12. A method as in claim 1, wherein the decision tree includes at least one variable that has at least three conditions.

13. A computer implemented method comprising:

transforming a decision tree for determining whether a particular type of credit card should be issued to a person into an optimal compact representation, the decision tree having a plurality of variables, a root node, intermediate nodes, and leaf nodes; and displaying the optimal compact representation of the decision tree;

wherein the transforming comprises:

converting the decision tree to a collection of independent decision chains, the independent decision chains being paths from the root node to a leaf node such that each node, except the root node, has a single parent and each node, except a leaf node, has a single child node.

14. A method as in claim 13, wherein the transforming further comprises:

computing an ordering of variables in the decision tree to lead to a directed acyclic graph with a minimum number of nodes; and converting the directed acyclic graph into an exception-based directed acyclic graph with a single exception to result in the optimal compact representation.

15. A method as in claim 14, wherein the nodes define conditions and the transforming further comprises:

normalizing the conditions for a variable level.

16. A method as in claim 15, wherein the transforming further comprises:

identifying redundant nodes; and merging the identified redundant nodes.

17. A method as in claim 16, wherein the nodes are merged in order based on level within the decision tree.

18. A computer-implemented method comprising:

transforming a decision tree into a directed acyclic graph, the decision tree having a plurality of variables, a root node, intermediate nodes, and leaf nodes, at least a portion of the nodes defining at least three conditions;

transforming the directed acyclic graph into an exception-based directed acyclic graph with a single exception to result in an optimal compact representation of the decision tree, the transforming comprising:

converting the decision tree to a decision chain structure by replacing any variables missing in any path of the tree with true nodes and replacing repeated occurrences of variables along any path with single nodes, normalizing the decision chain structure and merging any identical chains starting from the leaf nodes and merging level by level for all identical chains such that the entire decision chain structure is merged to a directed acyclic graph, and moving all nodes of a selected variable to a lower level one level at a time; and displaying the optimal compact representation of the decision tree.

* * * * *